United States Patent

Minborg et al.

[11] Patent Number: 5,930,705
[45] Date of Patent: Jul. 27, 1999

[54] METHOD AND SYSTEM FOR THE EXCHANGE OF SIGNALS IN A COMMUNICATIONS NETWORK

[75] Inventors: Per-Åke Minborg, Stora Höga; Hans-Olof Sundell, Öckerö; Joakim Pilborg; Magnus Johnson, both of Göteborg; Carl Lundquist, Sollentuna; Thomas Larsson, Bromma, all of Sweden

[73] Assignee: Telefonaktiebolaget LM Ericsson, Stolkholm, Sweden

[21] Appl. No.: 08/733,922

[22] Filed: Oct. 18, 1996

[30] Foreign Application Priority Data

Oct. 20, 1995 [SE] Sweden .................................. 9503704

[51] Int. Cl.6 ...................................................... H04Q 7/38
[52] U.S. Cl. ........................ 455/420; 455/74.1; 455/424; 455/445; 455/560
[58] Field of Search .................................... 455/420, 424, 455/426, 434, 445, 560, 561, 74.1, 422

[56] References Cited

U.S. PATENT DOCUMENTS

| | | |
|---|---|---|
| 4,920,567 | 4/1990 | Malek . |
| 4,959,851 | 9/1990 | Tobolski, Jr. et al. ............... 455/74.11 |
| 5,117,450 | 5/1992 | Joglekar et al. . |
| 5,134,645 | 7/1992 | Berken et al. ........................... 455/445 |
| 5,311,571 | 5/1994 | Pickert .................................... 455/422 |
| 5,335,325 | 8/1994 | Brax ........................................ 370/282 |
| 5,537,610 | 7/1996 | Mauger et al. ......................... 455/445 |
| 5,664,005 | 7/1997 | Emery et al. ........................... 455/422 |
| 5,673,308 | 9/1997 | Akhavan ................................. 455/426 |
| 5,771,452 | 6/1998 | Hanley et al. .......................... 455/445 |

FOREIGN PATENT DOCUMENTS

| | | |
|---|---|---|
| 0 569 314 | 11/1993 | European Pat. Off. . |
| 0 583 233 | 2/1994 | European Pat. Off. . |
| 1115315 | 5/1968 | United Kingdom . |
| WO87/00718 | 1/1987 | WIPO . |
| WO90/13962 | 11/1990 | WIPO . |
| WO91/00677 | 1/1991 | WIPO . |
| WO94/05114 | 3/1994 | WIPO . |
| WO94/28689 | 12/1994 | WIPO . |
| WO95/15664 | 6/1995 | WIPO . |

*Primary Examiner*—Willis R. Wolfe
*Assistant Examiner*—Hieu T. Vo
*Attorney, Agent, or Firm*—Burns, Doane, Swecker & Mathis, L.L.P.

[57] ABSTRACT

A communication system and a method exchange signals between a public telecommunication network and at least one communication arrangement via the communication system. The communication system comprises a network adapter unit comprising a first signal port which is connectable to the public telecommunication network and a second signal port. The communication further comprises at least one subscriber adapter unit comprising a third signal port for the exchange of signals with the second signal port and a fourth signal port which is connectable to the communication arrangement. The subscriber adapter unit is arranged to initiate a communication session in response to a connection signal. The network adapter unit is arranged to produce a completion message at the network adapter unit in response to reception, on the first signal port, of a disconnection signal from the public telecommunication network.

30 Claims, 8 Drawing Sheets

METHOD AND SYSTEM FOR THE EXCHANGE OF SIGNALS IN A COMMUNICATIONS NETWORK

BACKGROUND

The invention relates to a method for exchanging signals in a communication network. The invention further relates to a communication system which is connectable to a public telecommunication network.

A conventional public telecommunications network is based on that telephones and other communication arrangements are connected to the telecommunication network exchange by means of fixed wire connections. The signals, for example inputted telephone numbers, which are generated by the telephones, are delivered in a standardised way via the wire connections to an exchange in the telecommunication network. It is further known to connect specially adapted telephones with the public telecommunications network via a radio connection.

U.S. Pat. No. 5,117,450 describes a specially adapted telephone comprising a radio transceiver and a microcomputer with a memory. When a telephone conversation is to be initiated by the telephone, each inputted digit is stored in the memory, and a check of validity of the inputted telephone number is locally performed in the telephone before the connection is established with the telephone number that was input. This telephone must consequently be equipped with a lot of information on the different number combinations which are valid and the amount of the information becomes considerable in order to permit international telephone conversations as well.

British Patent No. 1 115 315 describes a first arrangement which comprises a telephone handset which is coupled to a relay-controlled radio transmitter and to a first radio receiver. When a telephone conversation is to be initiated from the telephone handset, the radio transmitter is activated by sending a precise tone signal via radio to a second receiver which is included in a second arrangement. The second arrangement is connected to a telephone line. The second receiver delivers the received tone signal to a filter which is selectively sensitive to a certain tone, and when the filter indicates the reception of the precise tone signal, it activates a relay which switches on a second radio transmitter in order to send a dial tone to the radio receiver of the telephone handset.

WO 95/15664 describes a radiotelephone system comprising a subscriber unit which in a wireless manner communicates with a Local Access Mobility Manager (LAMM). The LAMM is connected to a Local Exchange. According to WO95/15664 the subscriber unit sends a disconnect message to the LAMM when a customer ends a call. The LAMM sends a release message to the subscriber unit. The subscriber unit sends a release complete message to the LAMM, and the LAMM returns the radio channel to idle.

SUMMARY

The present invention concerns the problem of establishing a connection between a communication arrangement and a public telecommunication network in a way which is uncomplicated for the user The invention also relates to the problem of achieving wireless connections between a public telecommunications network and a communication arrangement with a standard signal interface according to a standard for wire-based connections to a standardised public telecommunication network. An example of such a telecommunication arrangement is a conventional telephone for connection to a telephone socket.

The invention further concerns the problem of producing a method for communication between the communication arrangement and a public telecommunication network, which method permits the exploitation of telephone subscriber services where the communication arrangement is wirelessly connected to the public telecommunication network.

It is an object of the invention to solve the above mentioned problems. These objects are achieved with a telecommunication system comprising a network adapter unit and a subscriber adapter unit connected to a public telecommunication network, to which a telecommunication network-adapted communication arrangement is connectable. Between the network-adapter unit and the subscriber-adapter unit exchange of information occurs according to any chosen transfer standard.

The network-adapter unit comprises a first interface means for communicating with the public telecommunication network and a first transceiver means which is connected with the first interface means. This subscriber-adapter unit comprises a second transceiver means for communication with the first transceiver means and a second interface means for communication with the communication arrangement.

The above mentioned problem is solved according to the invention with a method for exchanging signals between the communication arrangement and the public telecommunication network via the communication system. The method permits the communication arrangement to function in the same way as if the communication arrangement were connected directly to the public telecommunication network. In this way it permits the connection of, for example, a conventional telephone to the subscriber-adapter unit.

A communication session comprises a channel establishing phase, a user signalling phase, and a channel disconnection phase. During the user signalling phase, signals are provided in both directions in real time between the first communication arrangement and the public telecommunication network, via the communication system.

The method comprises the stage of initiating a communication session owing to a connection signal. The connection signal is either a Off-Hook-signal which is produced by, or because of, the first communication arrangement, or a ring signal which is provided to the network-adapter unit from the public telecommunication network. According to the invention, a communication session can be initiated independently of whether any characters are inputted by means of the push buttons of the communication arrangement.

A communication channel is established during the channel establishing phase and signals are transferred between the first signal port and the fourth signal port via the communication channel during the user signalling phase. The communication channel is disconnected during a channel disconnection phase.

The channel disconnection phase is initiated due to a disconnection signal which is supplied from the public telecommunication network.

BRIEF DESCRIPTION OF THE DRAWINGS

In order for the present invention to be easily understood and realized, it will be described by means of illustrative examples and with reference to the appended drawings, in which.

DETAILED DESCRIPTION OF EMBODIMENTS

In the following description mutually similar means and features in the different embodiments are indicated with the same reference number.

Figure 1:
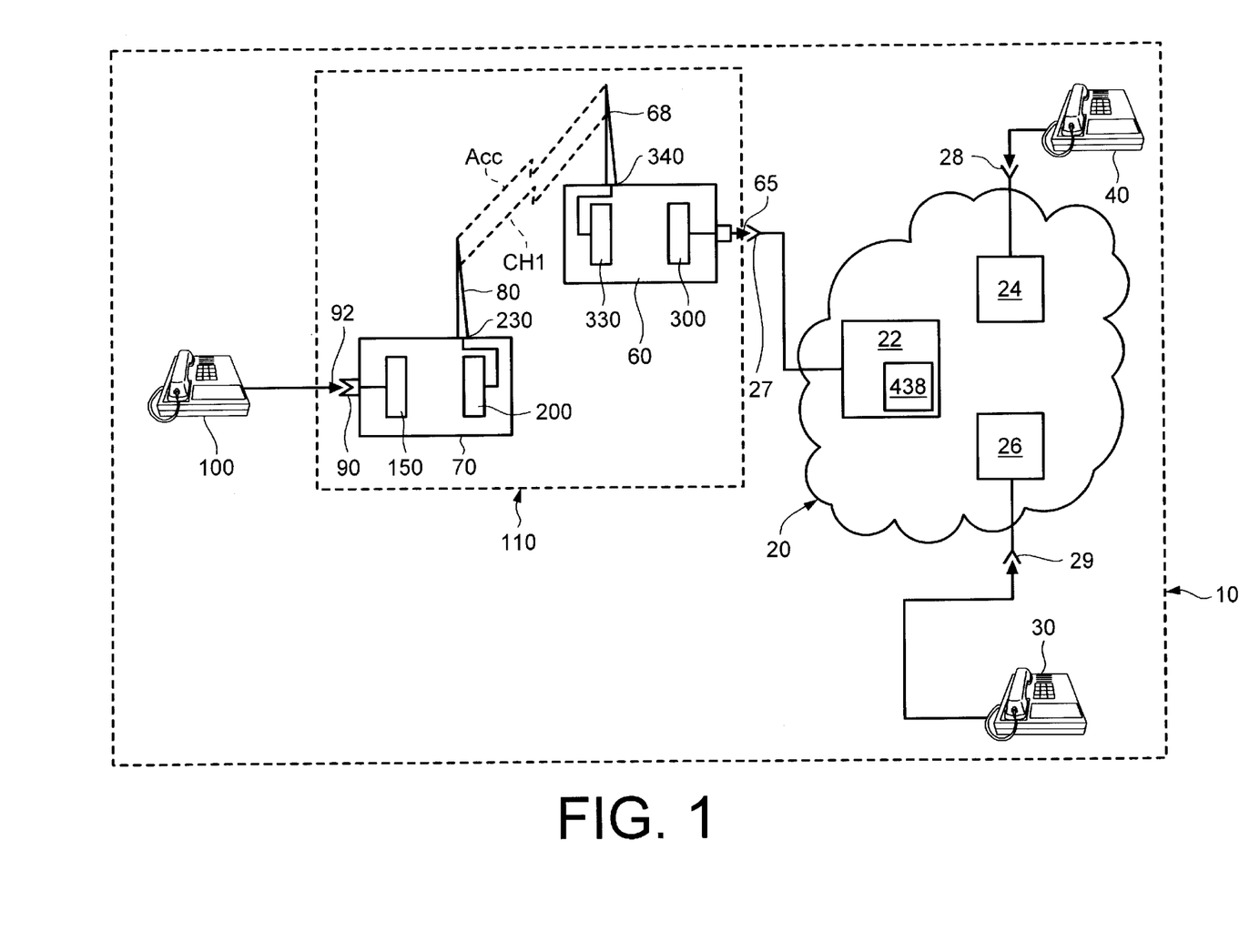
FIG. 1 shows a schematic drawing of a communication network according to one embodiment of the invention.

FIG. 1 shows a communication network 10 which comprises a public telecommunication network 20. The public telecommunication network 20 comprises exchanges 22, 24 and 26, respectively, which permit the creation of a communication channel between the communication arrangements which via connections 27, 28, 29 are connected to the telecommunication network 20. A first communication arrangement 30, 40 is a telephone, a telefax or a computer device which is arranged to communicate with the public telecommunication network 20. The first communication arrangement 30 can further be a mobile telephone which is connected with the public telecommunication network 20.

A network adapting unit 60 has a first connection socket 65 which is connectable to the public telecommunication network 20. According to one variant of the invention the adapting unit 60 is a radio unit. The radio unit 60 comprises a radio antenna 68 to permit radio connection with a subscriber adapter unit 70. The subscriber adapter unit 70 comprises a radio antenna 80 as well as a connection socket 90. There may be a plurality of subscriber adapter units 70 for cooperation with one network adapting unit 60.

The connection socket 90 is connectable to a connection socket 92 in a second communication arrangement 100.

The communication arrangement 100 according to one version of the invention takes the form of a telephone. The communication arrangement 100 can alternatively be formed by a telefax arrangement or a computer arrangement which is adapted to communicate with the public telecommunication network 20. The computer arrangement comprises for example a modem for communication with the telecommunication network.

The radio unit 60 and the radio unit 70 are comprised in a communication system 110 which via the connection socket 65 is connectable to the public telecommunication network 20 and which via the connection socket 90 can be connected with a communication arrangement 100.

Method for Performing a Communication Session

According to one embodiment of the invention communication via the communication system 110 is performed in three consecutive phases or procedural steps. This is described below with reference to FIG. 2.

Figure 2:
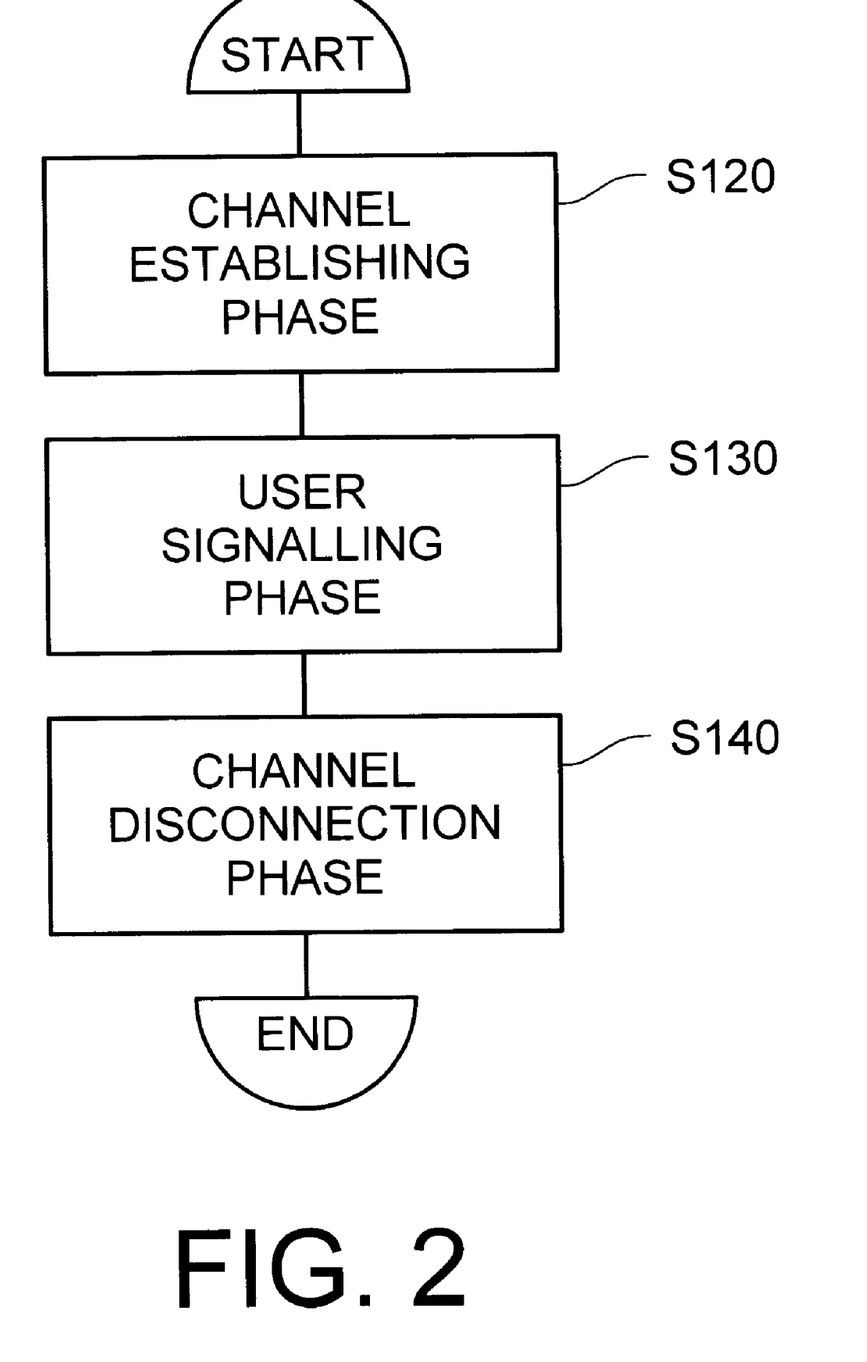
FIG. 2 shows a flow diagram for a communications session according to one embodiment of a method according to the invention.

The procedure is for example started through the user lifting the telephone handset of the communication arrangement 100. The subscriber adapter unit 70 comprises means for detecting that the handset is lifted and according to the procedure a first phase S120 then commences. During the first phase, the channel establishing phase, a traffic channel CH1 is established between the subscriber adapter unit 70 and the network adapter unit 60.

When the traffic channel CH1 has been established, a second phase S130 starts. During the second phase S130 signalling between the communication arrangement 100 and the public telecommunication network 20 is possible. The signals which are supplied from the telecommunication network 20 to the connection socket 65 are delivered via the communication system 110 to the connection socket 90 and vice versa, during the second phase S130. This exchange of signals between the connections 65 and 90 is called transparent signalling in the following, and the second phase S130 can be said to be a transparent signalling condition. The second phase S130 can also be called the user signalling phase.

When certain determined conditions have been fulfilled, the communication system is arranged to finish the second condition and go to a third phase S140. These conditions are described in more detail below with reference to FIG. 5B.

During the third phase, the channel disconnection phase S140, the transparent signalling is broken and the communication channel CH1 is closed.

The above described division of a communication into three consecutive phases makes it possible to connect a conventional telephone 100 to the connection 90, and according to the invention it is thereby possible for the user of telephone 100 to operate the telephone essentially as if it was connected directly to the public telecommunication network 20.

A Subscriber Adapter Unit

An embodiment of a subscriber adapter unit 70 is described with reference to FIG. 3A. As described above the unit 70 comprises a connection socket 90 to which a communication arrangement 100 can be connected. The connection socket 90 is joined to a local interface 150.

The local interface 150 furnishes the connection socket 90 with signals which correspond to the signal arrangements in a public telecommunication network which is described in more detail below. When a user desires a connection from the communication arrangement 100 to the public telecommunication network 20 (see FIG. 1), the user activates a hook signal. When the communication arrangement is a telephone with a handset, the hook signal is activated, for example through lifting the handset.

According to one embodiment of the local interface 150 it comprises a voltage source 160 and a current sensor unit 170, whereby a voltage is delivered to the communication arrangement 100. In order to produce the hook signal the user operates a switch 180, whereby the current consumption of the communication arrangement 100 is influenced in a way which is recognizable by the current sensor unit 170. The sensor unit 170 then supplies a hook signal to an output 190.

The hook signal can alternatively be produced actively by the communication arrangement 100.

The hook signal is delivered to a databus 192 which is connected with a signal port 194 of a signal processing unit 196. The signal processing unit 196 comprises a port 197, which is connected with a port 198 of a transceiver unit 200. Upon reception of the hook signal by the port 194, this signal is supplied further to the port 198 in order to initiate a procedure for the establishment of a traffic signal CH1 for the exchange of signals with the adapter unit 60. The transceiver unit 200 comprises a connection 230 for the exchange of signals with a first adapter unit 60.

During the transparent phase S130 the local interface 150 is arranged to reform the signals which the public telecommunication network 20 delivers to the first adapter unit 60.

During the channel connection phase and during the channel disconnection phase, certain signal exchanges take place by means of information blocks which are transferred via the traffic channel. During the user signalling phase, however, the exchange of both inband signals and outband signals take place simultaneously, via the traffic channel.

Figure 3A:
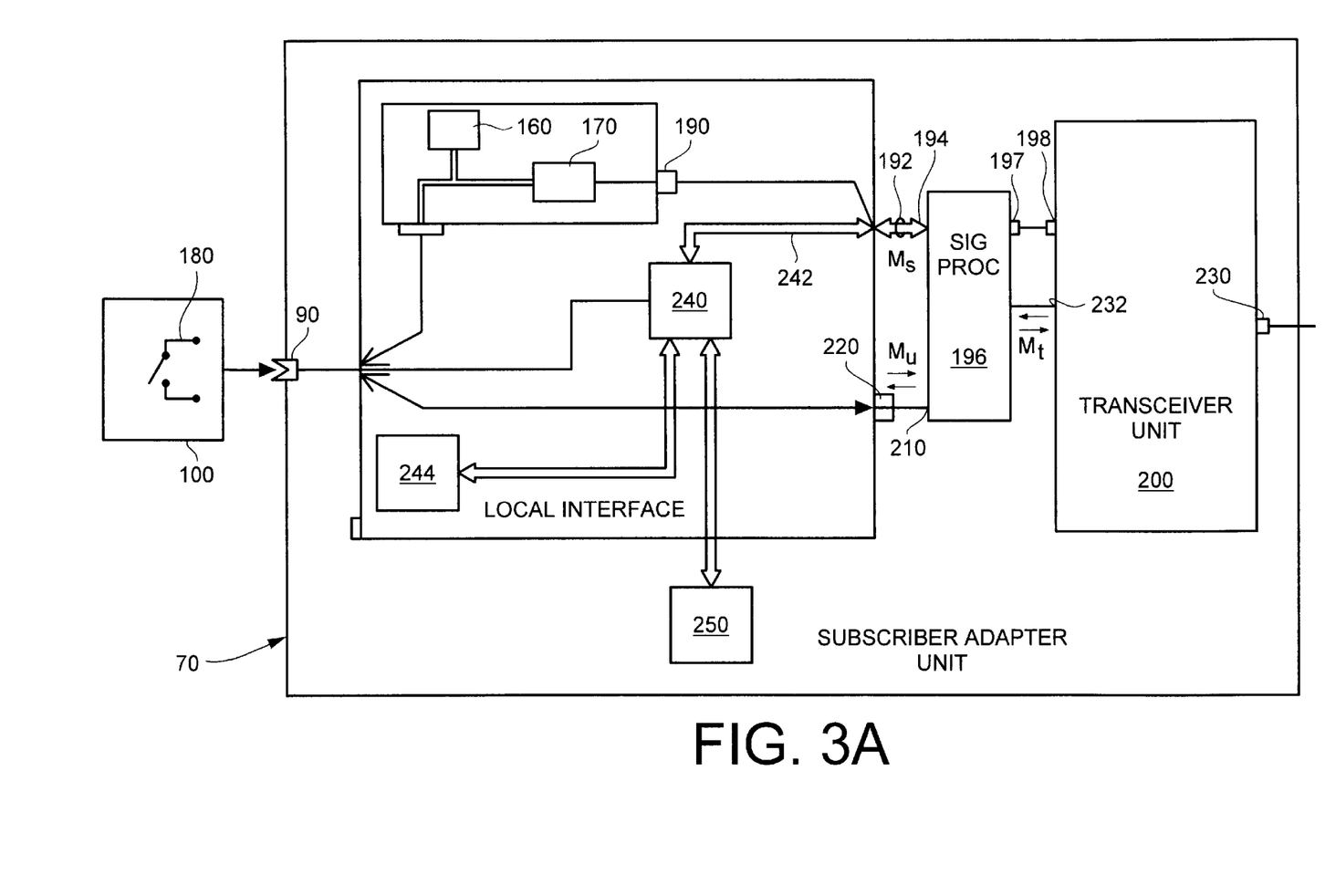
FIG. 3A shows a block diagram of a subscriber adapter unit according to one embodiment of the invention.
Figure 3B:
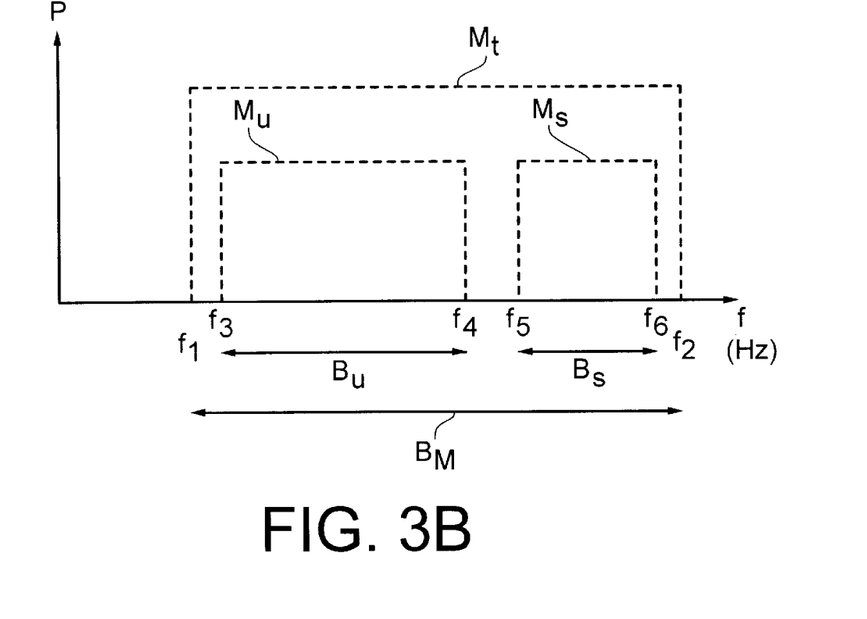
FIG. 3B illustrates a power spectrum for a message.

With reference to FIG. 3B, the function of a signal processing unit 196 according to one embodiment of the invention, is described.

Signal Exchange

The exchange of signals between the units 60 and 70, during the transparent phase S130 can be considered as the exchange of messages $M_t$ in both directions. A message $M_t$ can consequently comprise, on the one hand, inband signals $M_u$ and, on the other hand, outband signals $M_s$. An inband signal is a signal having a frequency within the frequency range of speech. An outband signal is a signal having a frequency outside the frequency range of speech. According to one embodiment of the invention the inband frequency range is defined as 300 Hz to 3400 Hz.

By means of the databus 192 outband signals are supplied between the local interface 150 and the signal processing unit 196. Examples of outband signals which are delivered to the signal port 90 are: the hook signal, charging signals and polarity signals which state which polarity the voltage shall have. The signal processing unit 196 has further a connection 210, which is connected with a connection 220 on the local interface 150. The exchange of inband signals $M_u$ such as for example telephone number signals dialled in by a user as DTMF-signals (Dual Tone Multi Frequency) and the user's speech etc. takes place between the connections 210 and 220.

The signal processing unit 198 is arranged to produce a message $M_t$ and supply this to a port 232 on the transceiver unit 200 in response to signals $M_s$ and $M_u$ received at the ports 194 and 210, respectively. Unit 196 is further arranged in response to a message $M_t$ received from ports 232, to deliver a corresponding inband signal $M_u$ to port 210 and/or a corresponding outband signal $M_s$ to the port 194. The local interface 150 comprises a computer unit 240, which via a databus 242 can communicate with the databus 192 (FIG. 3A). The computer unit 240 is further connected with a memory means 244 and with a setting-up means 250. By means of the setting-up means 250 the setting-up can be made of a selected set of standard signals. When the unit 196 delivers a certain outband signal, for example a charging signal, to the port 194, this is delivered via the databuses 192 and 242 to the computer unit 240. The computer unit 140 reads which standard set-up has been made via setting-up means 250 and then delivers a corresponding outband signal to the second connection socket 90 in accordance with the chosen standard.

According to one embodiment a message $M_t$ has a power spectrum which comprises a band width $B_M$ which extends between the border frequencies $f_1$ and $f_2$. With the purpose of producing a message $M_t$ which can comprise both inband signals $M_u$ and outband signals $M_s$, these are each placed in the frequency domain as is illustrated in FIG. 3B. According to one embodiment of the signal processing unit 196 the inband signals are allocated a fixed band width $B_u$ inside the band width $B_M$, and the outband signals are allocated a disjuncted fixed band width $B_s$.

According to another embodiment of the signal processing unit 196 the proportion that each band width $B_u$ and $B_s$ takes of the total band width $B_M$ is adjusted depending on the transfer requirement.

The band width $B_u$ is limited by the border frequencies $f_3$ and $f_4$, and the band width $B_s$ is limited by the border frequencies $f_5$ and $f_6$. According to an embodiment of the invention, the relation between the frequencies is as follows:

$$f_2 \geq f_6 > f_5 \geq f_4 > f_3 \geq f_1$$

According to another embodiment a digital message $M_t$ obtained by combining digital bit streams $M_u$ and $M_s$.

A Network Adapter Unit

Figure 4:
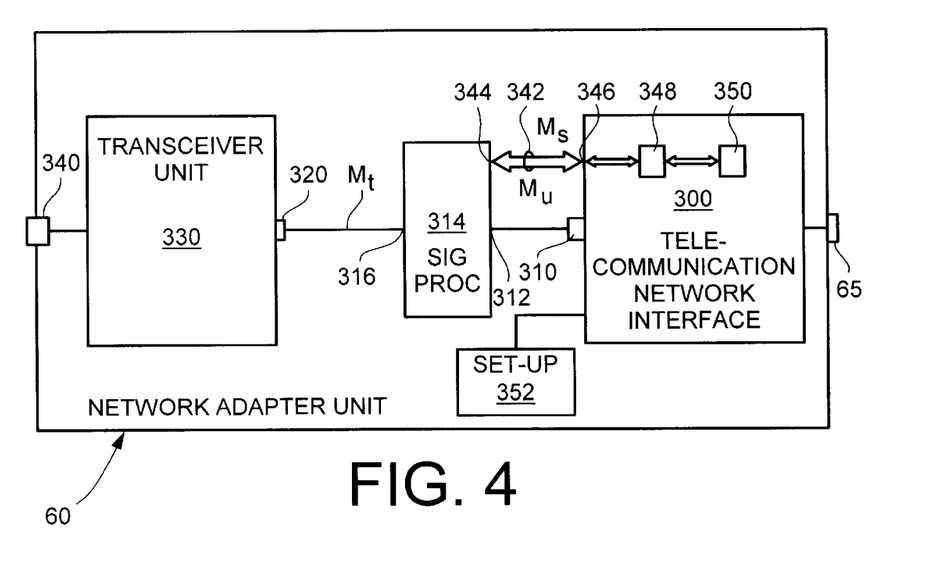
FIG. 4 shows a block diagram of a network adapter unit according to one embodiment of the invention.

An embodiment of a network adapter unit 60 is described with reference to FIG. 4. As described above, the network adapter unit comprises a connection socket 65 for communication connection with the public telecommunication network 20. The network adapter unit 60 comprises a telecommunication network interface 300 which is connected with the connection socket 65. The telecommunication network interface 300 is arranged during the transparent phase to reform or retransmit the signals which the first communication arrangement 100 delivers to the signal port 90.

The telecommunication network interface 300 has a connection 310 which is joined with a connection 312 on the signal processing unit 314. The signal processing unit 314 is connected via a port 316 with a port 320 on a transceiver unit 330. The transceiver unit 330 is connected with a connection 340 for the transfer signals with one or more subscriber adapter units 70.

A databus 342 connects a port 344 on the signal processing unit 314 with a port 346 on the telecommunication network interface 300. The signal processing unit 312 functions analogously with the above described signal processing unit 196. The telecommunication interface 300 comprises a computer unit 348 with a memory 350. The computer unit is connected with a set-up means 352 for the setting-up of the telecommunication network standard. With the intention of permitting the connection of the network adapter unit 60 to public telecommunication networks, which follow different standards, the unit 60 comprises consequently a memory means 350 with information of how each outband signal is coded according to the respective standard. When a certain outband signal is received from the telecommunication network 20 via the connection 65, the signal is translated according to the setting-up of the set-up means 352 and the corresponding system message $M_s$ is delivered by the computer unit 348 to the signal processing unit 314 via the databus 342. According to one embodiment the set-up means 352 comprises a memory position in a non-volatile memory means, such as for example an EEPROM. Conversely, when a outband signal is delivered to the connection socket 90 from for example the communication arrangement 100, then this outband signal is changed to a corresponding system message $M_s$, which via the communication channel is transmitted to the transceiver unit 330 (FIG. 1). The system message is translated by the computer unit 348 with the help of the set-up means 352 and the corresponding outband signal is delivered to the connection socket 65.

According to one embodiment of the invention, the exchange of signals is performed between the net adapter unit 60 and the subscriber adapter unit 70 by means of radio communication, and in this case the connection 340 is connected with the radio antenna 68, as is described above.

Initiating a Communication Session by a Communication Arrangement

The establishment of a connection from the communication arrangement 100 to the public telecommunication network 20 is described below with reference to FIGS. 1, 3, 4 and 5A.

The process is initiated through the communication arrangement 100 indicating that a hook signal is to be generated. As a consequence of the transceiver unit 200 (FIG. 3A) receiving the hook signal on the activating input 198, a call message is made on an access channel ACC. The call message is supplied to the network adapter unit 60. This is illustrated by process step S360 in FIG. 5A. According to an embodiment of the invention, the same access channel ACC is used for a plurality of subscriber units within a region.

Figure 5A:
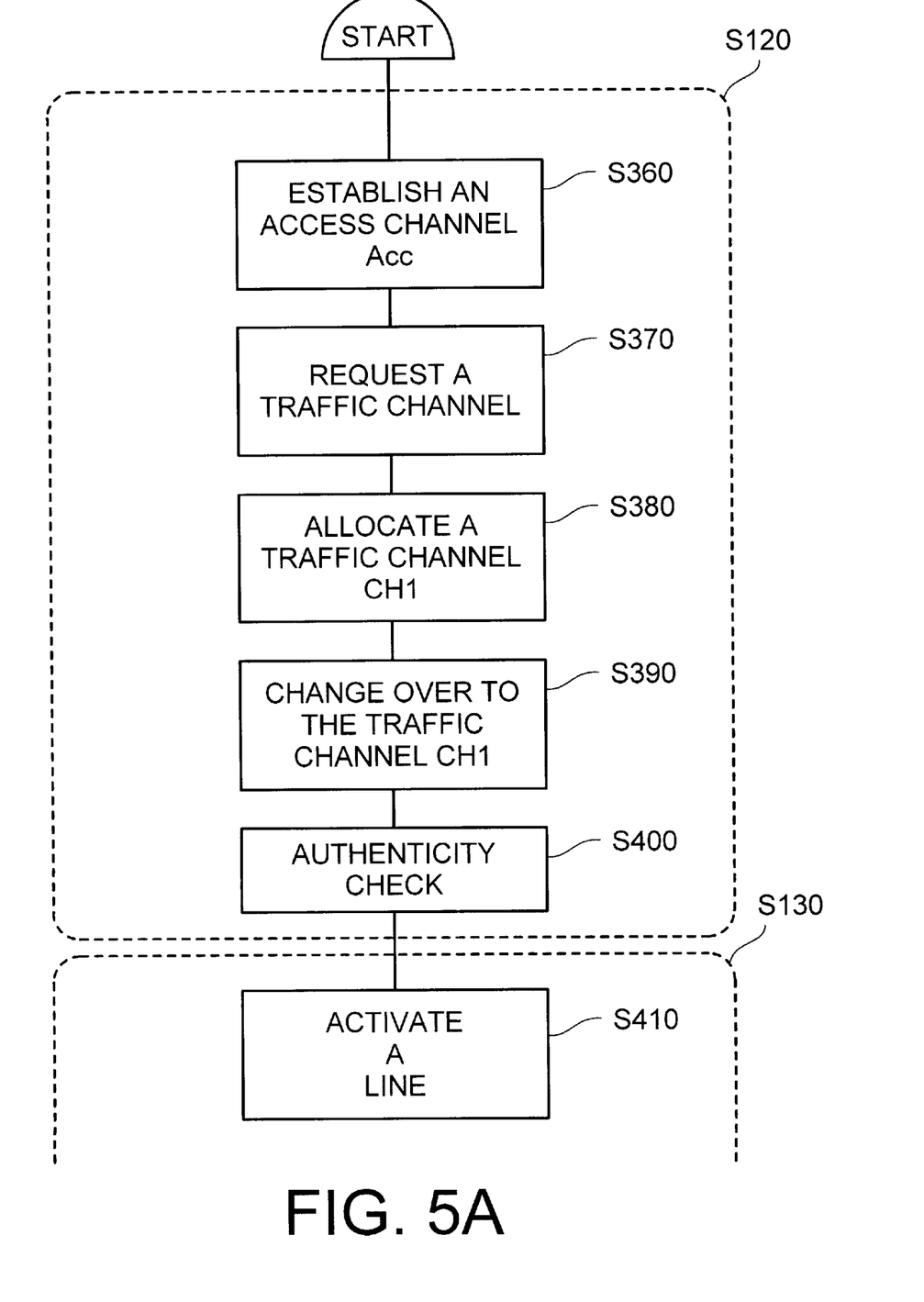
FIG. 5A shows a flow diagram for a channel establishing phase according to one embodiment of the method according to FIG. 2.

The next stage S370 in the procedure involves the subscriber transceiver 200 sending a request for a traffic channel CH1 to be established. This request is sent via access channel ACC.

The request is received by the central transceiver 330 and this searches for an available traffic channel.

The central transceiver 330 allocates a traffic channel CH1 (see step S380 in FIG. 5) and sends an order (step S390) to the local transceiver 200 to change over to the allocated traffic channel.

The authenticity of the subscriber adapter unit 70 is then checked by means of signalling in the traffic channel CH1 (step S400 in FIG. 5A). This occurs through the network adapter unit asking the subscriber adapter unit 70 to supply an identity code. The subscriber adapter unit 70 supplies an identity code, via the allocated communication channel CH1, to the network adapter unit 60. This can be done by a unique code being read out of the memory unit 244 and supplied to the transceiver unit 200.

According to one embodiment the subscriber adapter unit 70 supplies both an identity number IN and a hardware series number SN. The identity series number identifies the subscriber while the hardware series number identifies the hardware which is used by the user. When the identity numbers are received, the network adapter unit 60 checks that the received codes correspond with the corresponding codes which are stored in a memory means in the network adapter unit 60.

According to a second embodiment both the subscriber adapter unit 70 and the network adapter unit 60 are equipped with counting means which increment each a value at certain occasions, as for example each time a channel connection takes place. The subscriber adapter unit 70 inputs not only the calculated values but also the identity number IN and the hardware series number SN to a code unit, and this supplies, by means of an algorithm a modified identity code MIDA. The modified identity code is supplied via the traffic channel to the network adapter unit 60.

The network adapter unit 60 comprises also a code unit and produces in the same way a modified identity code MIDN depending on the calculated value in the network adapter unit's calculated value. The network adapter unit 60 compares the code MIDA received from the subscriber adapter unit with the code MIDN and, if the codes correspond, it permits the communication session to continue.

Once the authentication has been established, the channel establishing phase is over and the transparent phase S130 starts. According to one embodiment of the invention step S410 is performed parallel with step S400, whereby the transparent phase S130 is started after step S390.

If the authenticity check shows that there is no correspondence, the channel disconnection phase is immediately started. When the authenticity check shows that the subscriber unit is correct, the communication session continues.

During step S410 the telecommunication network interface 300 activates a line to the public telecommunication network 20 and receives a dial tone on connection 65. The dial tone is an example of a message $M_u$ which the interface 300 supplies to the signal processing unit 314, which in turn integrates $M_u$ into a message $M_t$. The message $M_t$ is supplied to the input 320 of the central transceiver 330. The central transceiver codes and/or modulates the message in order to transfer it via the traffic channel CH1 to the local transceiver 200 in the subscriber adapter unit 70.

The local transceiver decodes and/or demodulates the signal received via traffic channel CH1, reforms the message $M_t$ and supplies this to the connection 232 (FIG. 3A). The message $M_t$ is supplied to the signal processing unit 196, which separates the inband signals $M_u$ from the outband signals $M_s$, and supplies the dial tone to the connection 220 of the local interface 150.

The dial tone received by the connection 220 is supplied to the connection 90 for further transmittal to the communication arrangement 100.

During the transparent phase S130 the local interface 150 reforms the outband signal $M_s$ which the public telecommunication network 20 delivers to the connection 65 of the network adapter unit 60. In a corresponding way the telecommunication network interface 300 reforms the outband signals which the communication arrangement 100 supplies to the connection 90 of the subscriber adapter unit.

The channel connection procedure S120 is carried out according to the invention within a certain time interval from when a hook signal is received from the communication arrangement 100. This time interval can be selected to be so short that a user of the communication arrangement 100 experiences his communication arrangement as if it was directly coupled to the public telecommunication network 20. The time interval from that a hook signal is formed to that the transparent signalling condition is started is less than 15 seconds. According to one embodiment the time interval is between 0.1 and 10 seconds. According to another embodiment the time interval is between 0.1 and 1.0 second. According to a preferred embodiment the time interval is less than 0.5 seconds, e.g. between 0.01 and 0.5 second.

During the transparent phase S130 the communication arrangement 100 then essentially functions as if it was directly connected to the telecommunication network 20.

In the above, an embodiment of a channel connection phase has been described, where the unit 70 requests a traffic channel by means of signalling via an access channel, and where the unit 60 allocates a traffic channel.

This means that the unit 60 and its transceiver unit 330 watch the radio channels and allocate an available channel on request from a subscriber transceiver.

Initiating a Communication Session by the Telecommunication Network

The unit 60 and its transceiver unit 330 will allocate an available traffic channel on receipt of a ring signal from the telecommunication network 20. When a ring signal is received via signal port 65, it is translated by the computer unit 348 and a message is sent to the transceiver unit 330 to send a call via access channel ACC. The call comprises an instruction addressed to the selected subscriber adapter unit to transfer over to the allocated traffic channel. When the connection is established via the traffic channel, the ring signal is sent as a system message to the user adapter unit. The ring signal can alternatively be sent by means of data frames within the message band width $B_M$.

The Transparent Phase

Figure 5B:
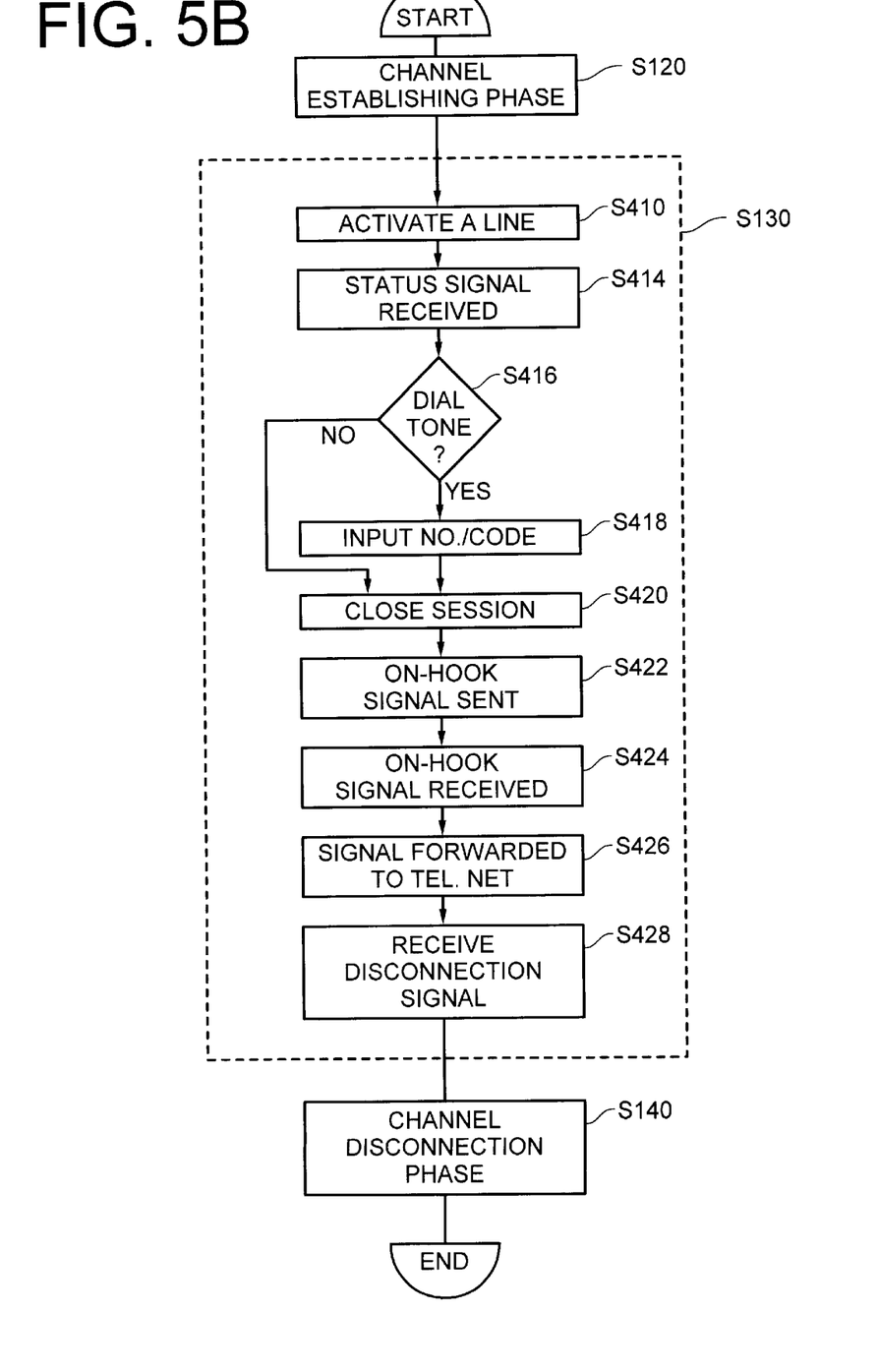
FIG. 5B shows a more detailed flow diagram for a communication session according to FIG. 2, with a transparent signalling phase according to one embodiment of the method.

With reference to FIG. 5B an example of a communication session is described, in order to make clear the features and advantages of the invention.

As is described above, the channel establishing phase S120 is initiated by a user of the communication arrangement 100, which leads to a connection being formed between the adapter unit 70 and 60 (see FIG. 5B and FIG. 1).

The transparent phase S130 is then started by the network adapter unit 60 activating a line to the public telecommunication network 20, whereby an exchange unit 22 delivers a status signal to the network adapter unit (step S410). This status signal can be a dial tone signal which states that the telecommunication network is ready to receive signals from arrangement 100, alternatively it can be a status signal stating that there is some error in the telecommunication network or that all available lines are occupied.

In step S414, unit 60 receives the status signal, and the signal is forwarded by the communication system 110 to the communication arrangement 100.

The communication arrangement 100 receives the status signal and obtains the possibility to act on the status signal (step S416). When the status signal is a dial tone and the communication arrangement is a telephone, the telephone user can judge that the status signal means that the telecommunication network is activated and ready to receive further signals from the communication arrangement 100. In this case the user in the next step S418 can dial in the numbers by means of the push buttons of the telephone 100, speak in messages etc. Each signal inputted into the unit 70 via the communication arrangement 100 is supplied to the exchange unit 22 in the telecommunication network 20 (see FIG. 1). The user can, for example, in step S418 input a code for some telephone service. The characters inputted by the user can be pulse-coded or tone-coded.

Once the user has finished his communication he can put down the telephone handset or do some other corresponding action in order to close the session, as is illustrated by step S420 in FIG. 5B.

If the user during step S416 makes the judgement that the status signal means that the telecommunication network is not ready to communicate, he can choose to put down the telephone handset (step S420).

When the handset is put down, or corresponding action is taken at the communication arrangement 100, this is detected in step S422 and a On-Hook-Signal is made and delivered to the databus 192 (FIG. 3A) in the same way as described above for the hook signal. During the procedure step S422 shown in FIG. 5B, the On-Hook-Signal is integrated within band width $B_s$ (FIG. 3B) and the corresponding message $M_s$ is sent from the unit 70 to the unit 60.

It should be noted that the transparent signalling condition S130 within the communication system 110 is retained the whole time from when the channel connection phase S120 is finished until the connection is broken during the channel disconnection phase S140.

Ending a Communication Session

In the following it will be described how disconnection can be caused by the communication arrangement 100 and the subscriber adapter unit 70.

The system message "On-Hook" produced in step S422 is received (step S424, FIG. 5B) by the computer unit 348 (FIG. 4) in the network adapter unit 300, and as a consequence thereof the unit 300 delivers the corresponding standard signal "On-Hook" to the signal port 65, for forwarding to the telecommunication network 20 (step S426, FIG. 5B).

According to the invention it is then left to the public telecommunication network to determine if and when the connection between the telecommunication network 20 and the communication arrangement 100 shall be broken. In other words the connection and the transparent signalling condition S130 remain at least until the public telecommunication network sends a disconnection signal to the signal port 65 of the network adapter unit.

According to one standard for public telecommunication networks a disconnection signal is produced after an "On-Hook-Signal" is received from the subscriber 100 for a predetermined time. This time can, for example, be five seconds. The disconnection signal is sent for example from the exchange 22 to the network adapter unit 60.

The procedural step S428 shown in FIG. 5B illustrates that the network adapter unit 60 receiving a disconnection signal from the public telecommunication network. The channel disconnection procedure is started owing to the disconnection signal.

Figure 5C:
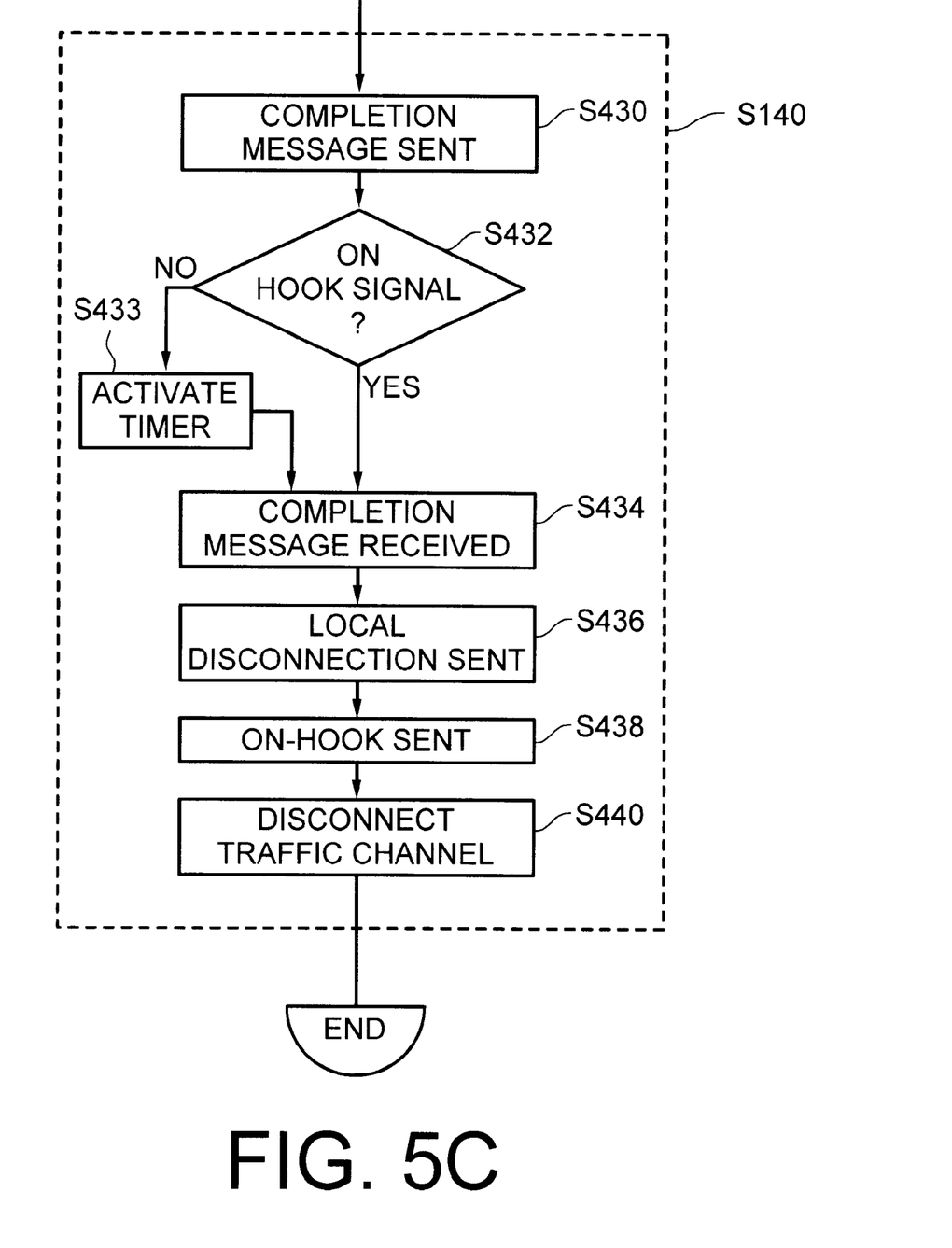
FIG. 5C shows a flow diagram for a channel disconnection phase according to one embodiment of the method according to FIG. 2.

With reference to FIG. 5C an example of a method for the channel disconnection phase S140 is described.

In a first step S430 of the channel disconnection phase, the network interface 300 produces a completion message "central disconnection" as a consequence of the disconnection signal. The completion message is formed by the computer unit 348 and sent to the unit 70.

In a following step S432 a check is made whether the communication arrangement produces an "On-Hook-Signal" or an "Off-Hook-Signal". If this check shows that an "On-Hook-Signal" is being delivered by the communication arrangement 100, step S434 should be performed next.

If the check shows that the "Off-Hook-Signal" is delivered by the communication arrangement 100, a timer function (step S433) is activated by the computer unit 348. The timer function is set up for a predetermined time period and during this time period the interface unit 300 is arranged to indicate an engaged status if a ring signal is received from the telecommunication network 20. In this way is achieved the object that the communication arrangement 100 seen from the telecommunication network functions as a directly connected telephone. If the "Off-Hook-Signal" is still indicated by the communication arrangement 100 at the end of the time period, the procedure continues, despite this, with step S434.

During the following step S434 the subscriber adapter unit 70 receives the message "Central disconnection". The message is delivered via the databuses 192 and 242 to the computer unit 240, which as a consequence thereof makes sure that the interface unit 150 supplies to the signal port 90 the standard signal which the telecommunication network should produce with an "On-Hook-Signal". This standard signal is for example a certain polarity of the voltage which is delivered to the communication arrangement 100.

During the following step S436 the computer unit 240 generates a message "Local disconnection", and this is sent in the above described way as a system message M$_s$ to the network adapter unit 60.

During the immediately following step S438 the system message M$_s$ with the content "local disconnecting", is received by the network interface 300, and the computer unit 348 delivers as a consequence thereof the outband signal "On-Hook" to the signal port 65, for further transmission to the public telecommunication network 20. If the channel disconnection phase S140 was initiated by the communication arrangement 100 producing "On-Hook", step S434 means that the signal "On-Hook" is retained and continuously indicated to the public telecommunication network 20.

The computer unit 348 produces in step S440 an order to disconnect the traffic channel CH1, and this order is delivered to the transceiver unit 330, which thereupon disengages the traffic channel. Disengaging or releasing a channel means that the channel can subsequently be used either for communication between another local adapter unit and the central unit 60, or by two completely different units.

According to a second embodiment of the disconnection procedure, step S430 is preformed like in the above described embodiment, but thereafter step S434 is performed. During step S434 the subscriber adapter unit 70 receives the message "Central disconnection". In response to this message the subscriber adapter unit 70 indicates to the arrangement 100 that the telecommunication network 20 has been disconnected. The disconnection indication may be a polarity change of the voltage supplied to the arrangement 100. Thereafter step S432 is performed. In step S432 a check is made whether the communication arrangement produces an "On-Hook-Signal" or an "Off-Hook-Signal".

If this check shows that an "On-Hook-Signal" is being delivered by the communication arrangement 100, steps S436 to 440 should be performed next, as described above.

If the check shows that the "Off-Hook-Signal" is delivered by the communication arrangement 100, a message to that effect is delivered from unit 70 to unit 60. In response to this "Off-Hook-Message" unit 70 disconnects the traffic channel CH1, but retains the status "Off-Hook" towards the telecommunications network 20. The "Off-Hook" status will remain until unit 60 receives a new message from unit 70 with the information that the arrangement 100 produces the "On-Hook-Signal". The new "On-Hook-Message" unit 70 may be transmitted on the Access channel ACC. Alternatively, a specially adapted communication session, including a channel establishing phase S120, is performed for just delivering the message that the "On-Hook-Signal" has been received from the arrangement 100. According to that version the new "On-Hook-Message" is transmitted on a traffic channel. The traffic channel CH1 is disengaged by unit 60 on reception of the new "On-Hook-Message", and unit 60 also delivers the "On-Hook-Signal" to the telecommunication network 20.

In this way is achieved the object that the communication arrangement 100 seen from the telecommunication network functions as a directly connected telephone.

According to a third embodiment of the disconnection procedure, the disconnection phase functions as described in the second embodiment until step S432 has been performed. The third embodiment differs in that if the check shows that the "Off-Hook-Signal" is delivered by the communication arrangement 100, a message to that effect is delivered from unit 70 to unit 60 to cause unit 60 to indicate "Off-Hook" to the telecommunication network 20 and the traffic channel is retained until unit 70 receives an "On-Hook-signal" and the corresponding message has been received at unit 60.

Ending the Communication Session from Another Subscriber Arrangement

The disconnection can alternatively be initiated by another subscriber, e.g. telephone 40, being connected to the communication arrangement 100 and now producing an "On-Hook-Signal". The "On-Hook-Signal" caused by telephone 40 causes in a known way the telecommunication network 20 to deliver a disconnection signal to the signal port 65. Subsequently the channel disconnection procedure is performed from step S430 according to one of the manners described above.

A Direct Connection Service

As described with reference to FIG. 5B, the invention means that a connection between the subscriber's communication arrangement 100 and the public telecommunication network is achieved as a direct consequence of a hook signal being produced by the communication arrangement 100. The subscriber does not need to input any number in order to achieve connection to the telecommunication network 20.

This characteristic of the communication system 100 means that a direct connection service is possible, as will be described below.

As described with reference to FIG. 5B, the user can during the transparent phase S130 receive signals from and send signals to the public telecommunication network 20. The user can then, for example, in the above described step S418 input a code which identifies a telephone service. The service code is forwarded via the communication system 110 to the telecommunication network 20, and in this way the public telephone service can be ordered and obtained in the same way as if the communication arrangement 100 were connected directly to the telecommunication network 20.

In the following a procedure for ordering a direct connection service is described.

The user inputs a service code which identifies the service order as for example the dial sequence *700* and the telephone number to which the user will be directly connected when the handset is lifted next time. The dial sequence can for example be *700*875643#. This symbol sequence is delivered to a memory means 438 in exchange 22 which is part of the public telecommunication network 20 (FIG. 1). Exchange 22 also receives an A-code from the calling party, i.e. from the network adapter unit 60 or subscriber adapter unit 70. Alternatively the exchange 22 can determine an A-code as a consequence of which physical connection is activated. The A-code identifies the customer of the service. On receipt of the code for ordering a direct connection service, the A-code is used as a pointer to the memory position in the memory means 438, and in the pointed out memory position the number inputted in by the telephone user, or a B-code corresponding to the inputted telephone number, is stored.

According to the invention the user can further decide how much time is to elapse from the handset being lifted and the "Off-Hook"-signal being produced, to the direct connection being initiated.

By inputting for example the sequence

*700* time code * B-telephone number # where the time code is e.g. 5, the user can state that the direct connection service is to be activated five seconds after the handset has been lifted, in the case the user has not inputted any characters before then. In this way the telephone 100 can be used as a normal telephone, with the extra advantage that a predetermined connection is performed if no dial is inputted during the predetermined time period. The characters can be inputted for example with DTMF-coding in a way which is common in modern telecommunication equipment.

When this direct connection service has been ordered, the user of telephone 100 can replace the handset.

When, thereafter, the telephone handset is lifted, the telecommunication net-work 20 will in the usual way receive an A-code which identifies the party having connected to the telecommunication network. The A-code is used by the telecommunication network 22 to point out a particular exchange 22 and the memory position where it appears that some service has been ordered. The A-code, or a corresponding code, is used to point out the position where the number inputted by a user, or a corresponding code determined by the system, is stored. The exchange 22 reads the pointed out code and performs the connecting of a connection to the corresponding subscriber connection 28 and to the communication arrangement 40 connected to the subscriber connection (FIG. 1).

A direct connection service according to the invention can be ordered and used from any of the communication arrangements 100, 30 or 40, and connection can then be performed to any of the other communication arrangements which are connected to the public telecommunication network 20.

Signal Transfer Method

In the way described above, a signal transfer between the central transceiver 330 and the local transceiver 200 can take place by means of radio communication.

The transceiver 200 modulates the messages $M_t$ received by the port 232 and as a consequence thereof supplies a transmit signal to the antenna 80. According to a first embodiment the radio communication takes place by means of frequency multiplexing, FDMA.

Figure 6:
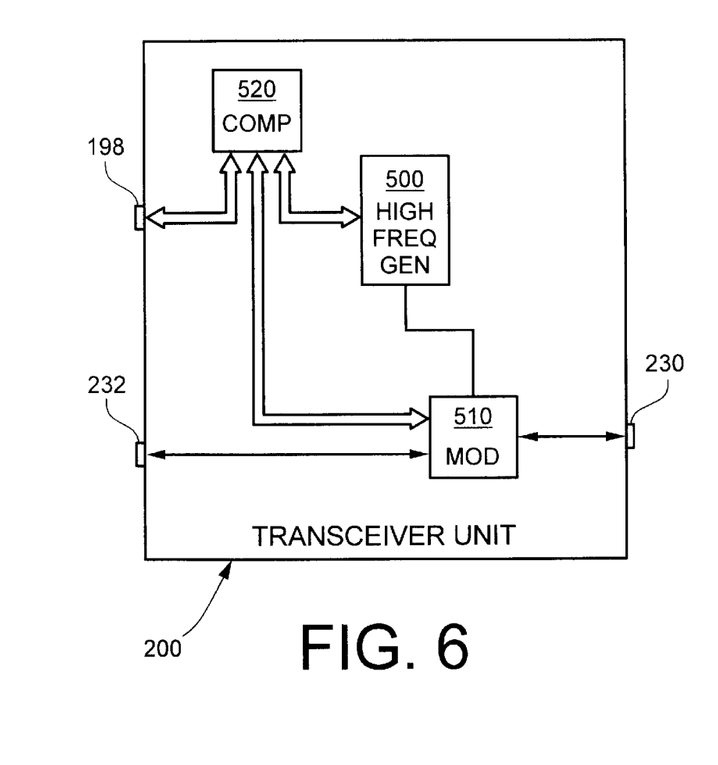
FIG. 6 shows a block diagram of a first embodiment of a transceiver unit according to the invention.

As illustrated in FIG. 6, the transceiver 200 comprises a high-frequency generator 500 which can supply a carrier frequency signal. The high-frequency generator 500 is connected to a modulator 510, which is also in connection with the port 232. The modulator 510 is arranged to modulate the message $M_t$ on the carrier frequency signal and supply the resulting transmitter signal to the output 230.

By means of a computer unit 520 the frequency of the carrier frequency signal can be checked and controlled, so that frequency multiplexing is achieved. In this way, for example, different traffic channels CH1 and CH2, respectively, can be defined by different carrier frequencies.

According to a second embodiment, radio communication is based on time multiplexing TDMA. According to this embodiment the high-frequency generator is adjusted to supply a precise frequency, and the computer unit 520 regulates the modulator 510 to produce transmit signals only within precise time gaps. Through a combination of FDMA and TDMA a traffic channel can be defined by a defined carrier frequency and precise time gaps.

According to a third embodiment, code multiplexing is used for the signal transfer between the local transceiver 200 and the central transceiver 330. According to this embodiment the transceiver 200 comprises a sequence generator 530 (see FIG. 7). The sequence generator 530 is under the control of the computer unit 520.

Figure 7:
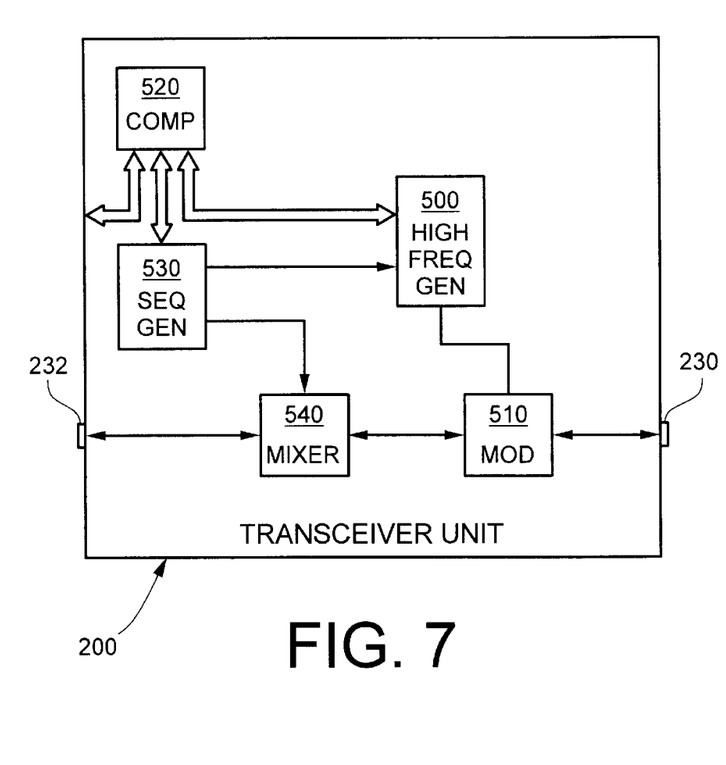
FIG. 7 shows a block diagram of a second embodiment of a transceiver unit according to the invention.

According to a variant of the third embodiment, a stream of bits $S_d$ produced by the sequence generator is supplied to a mixing module 540. The mixing module 540 converts the message $M_t$ received from the port 232 to a digital bit stream $S_{Mt}$. The mixing module is arranged to in a signal-like manner multiply the message bit stream $S_{mt}$ with the sequence bit stream $S_d$ and supply the resulting signal to the carrier wave modulator 510. The carrier wave modulator therewith produces a signal according to a principle often called CDMA.

According to second variant of the third embodiment, the sequence generator is arranged to supply the bit stream $S_d$ to the high-frequency generator and thereby to modulate the carrier frequency signal so that frequency-hopping code multiplexing is achieved.

A number of embodiments of the transceiver 200 have been described in the above with the weight of the description lying on transmission of a message $M_t$ from the transceiver 200. The transceiver 200 further comprises means for receiving in the corresponding way signals at the port 230 and demodulating these signals. The transceiver 200 thus comprises demodulating means for demodulation of received frequency-, time- or code multiplied signals. With reference to the detailed description of the transmission means, the man skilled in the art will understand how corresponding receiver means are built-up, and therefore this text will not be encumbered with such a more detailed description.

The central transceiver 330 arranged in the network adapter unit 60 functions in a corresponding way to the local transceiver 200.

As described in connection with FIG. 1, the output of the transceiver is connected with a radio antenna. According to a variant of the invention, the antenna 80 is an antenna with a directional effect, such as e.g. a parabol antenna. The antenna 80 can be fixedly mounted and directed towards the central antenna 68. Alternatively the antenna 80 can have an adjustable directional effect.

The central antenna 68 is, according to this variant of the invention an electrically controllable antenna with adjustable directional, effect. According to a variant of the invention, the antenna 68 is an antenna array. By adjusting the directional antenna 80 and 68, respectively, so that they, at least during precise time intervals, are directed towards each other, a Space Division Multiple Access SDMA is achieved. In this way several different local transceivers 200A, 200B, 200C can work side by side on the same carrier frequency without interfering with each other.

The Space Division Multiple Access can according to the invention be combined with each of the above described frequency-, time- and code-multiplexing techniques, respectively.

What is claimed is:

1. Communication system for signal connection between a public telecommunication network (20) and at least a first communication arrangement (100), the communication system (110) comprising:

a network adapter unit (60) comprising a first signal port (65) which is connectable to the public telecommunication network (20), a second signal port (340), and a first signalling means which is arranged to establish a communication channel during a channel establishing phase; and at least one subscriber adapter unit (70) comprising a third signal port for wireless exchange of signals with the second signal port, a fourth signal port which is connectable to the communication arrangement (100), a second signalling means which is arranged to communicate with the first signalling means (330) via the communication channel during a transparent signalling phase, and a local initiating means (200) which is arranged to initiate a communication session in response to a connection signal, wherein the network adapter unit (60) is arranged to produce a completion message at the network adapter unit (60) in response to reception, on the first signal port (65), of a disconnection signal from the public telecommunication network (20);

the first signalling means (330,200) is arranged to deliver the completion message to the subscriber adapter unit (70);

the subscriber adapter unit (70) is arranged to deliver a disconnection signal on the fourth signal port in response to the completion message; and the first signalling means (330,200) is arranged to disengage the communication channel after the reception of the disconnection signal.

2. Communication system according to claim 1, wherein the network adapter unit is arranged to disengage the communication channel in response to reception of the disconnection signal.

3. Communication system for signal connection between a public telecommunication network (20) and at least a first communication arrangement (100), the communication system (110) comprising:

a network adapter unit (60) comprising a first signal port (65) which is connectable to the public telecommunication network (20) a second signal port (340), a central initiating means (300) which is arranged to initiate a communication session as a consequence of a connection signal during a channel establishing phase, and a first signalling means (330) which is arranged to establish a communication channel during the channel establishing phase; and at least one subscriber unit (70) comprising a third signal port for wireless exchange of signals with the second signal port, a fourth signal port which is connectable to the communication arrangement (100), and a second signalling means which is arranged to communicate with the first signalling means (330) via the communication channel during a transparent signalling phase the network adapter unit (60) is arranged to produce a completion message at the network adapter unit (60) in response to reception, on the first signal port (65), of a disconnection signal from the public telecommunication network (20);

the first signalling means (330,200) is arranged to deliver the completion message to the subscriber adapter unit (70);

the subscriber adapter unit (70) is arranged to deliver a disconnection signal on the fourth signal port in response to the completion message; and the first signalling means (330,200) is arranged to disengage the communication channel after the reception of the disconnection signal.

4. Communication system according to claim 3, wherein the subscriber adapter unit (70) is arranged to deliver a confirmation message to the network adapter unit (60) after the reception of the completion message.

5. Communication system according to claim 4, wherein, the network adapter unit is arranged to disengage the communication channel in response to reception both of the disconnection signal and the confirmation message.

6. Method for the exchange of signals between a public telecommunication network (20) and at least a first communication arrangement (100) via a communication system (110), the communication system comprising a network adapter unit (60) comprising a first signal port (65) which is connectable to the public telecommunication network (20) and a second signal port (340) and at least one subscriber adapter unit (70) comprising a third signal port for wireless exchange of signals with the second signal port and at least a fourth signal port which is connectable to the communication arrangement (100) the method comprising the steps of:

establishing a communication channel in response to a connection signal (S120);

transferring signals between the first signal port and the fourth signal port via the communication channel during a transparent signalling phase (S130);

receiving, on the first signal port (65), a disconnection signal from the public telecommunication network (20);

producing a completion message at the network adapter unit (60) as a consequence of the disconnection signal;

delivering the completion message to the subscriber adapter unit (70);

delivering a disconnection signal on the fourth signal port in response to the completion message; and disengaging the communication channel after the reception of the disconnection signal.

7. Method according to claim 1, further comprising the step of:

delivering a confirmation message from the subscriber adapter unit (70) to the network adapter unit (60) after the reception of the completion message.

8. Method according to claim 7, wherein the communication channel is disengaged in response to reception of the disconnection signal as well as the confirmation message.

9. Method according to claim 1, wherein the communication channel is disengaged in response to reception of the disconnection signal.

10. Method according to claim 1, wherein the disconnection signal is produced in the public telecommunication network (20) as a consequence of a On-Hook-signal which is produced by, or as a consequence of, the first communication arrangement (100).

11. Method according to claim 1, wherein the disconnection signal is produced in the public telecommunication network (20) as a consequence of an On-Hook-signal which is produced by, or as a consequence of, a second communication arrangement (40).

12. Method according to claim 11, further comprising the step of:

relaying the established Hook-signal to the first signal port (65).

13. Method according to claim 12, further comprising step of:
   retaining the Off-Hook-signal on the first signal port (65) after disengaging the communication channel when the established Hook-signal is an Off-Hook-signal.

14. Method according to claim 13, further comprising the step of:
   transmitting an On-Hook-message from the subscriber adapter unit (70) to the network adapter unit (60) in response to an On-Hook-signal which is produced by, or as a consequence of, the first communication arrangement (100) after the disengagement of the communication channel;
   changing the Off-Hook-signal on the first signal port (65) to a On-Hook-signal in response to reception of the On-Hook-message.

15. Method according to claim 12, further comprising an step of: retaining the Off-Hook-signal on the first signal port (65) and retaining the communication channel, when the established Hook-signal is an Off-Hook-signal, until an On-Hook-signal is received on the fourth signal port (90).

16. Method according to claim 6, further comprising the step of establishing whether the fourth signal port receives an Off-Hook-signal or an On-Hook-signal from a communication arrangement (100) after the reception of the completion message.

17. Method according to claim 1, wherein the connection signal is an Off-Hook-signal which is produced by, or as a consequence of, the first communication arrangement.

18. Method according to claim 17, wherein the communication session is initiated independently of whether any dial character is input by means of the communication arrangement (100).

19. Method according to claim 1, wherein the connection signal is a ring signal or a polarity reversal signal, which signal is supplied to the network adapter unit from the public telecommunication network.

20. Method according to claim 1, wherein the duration of channel establishing is shorter than a first time period, wherein the first time period is fifteen seconds.

21. Method according to claim 1, wherein the duration of channel establishing is shorter than a first time period, wherein the first time period is one second.

22. Method according to claim 1, further comprising the step of:
   transferring inband signals, having a frequency within a predetermined frequency range, in a transparent manner between the first signal port (65) and the fourth signal port (90) via the communication channel.

23. Method according to claim 1, further comprising the step of:
   transferring outband signals, having a frequency outside a predetermined frequency range, in a coded manner between the first signal port (65) and the fourth signal port (90) via the communication channel.

24. Method according to claim 1, wherein the channel establishing step comprises the steps of:
   sending a call between the second signal port (340) and the third signal port (230) via an access channel (ACC);
   searching for an available communication channel (CH1);
   allocating a communication channel (CH1) when available;
   instructing the subscriber adapter unit (70) to transfer over the exchange of signals to the allocated communication channel (CH1);
   requesting the subscriber adapter unit (70) to supply an identity code;
   supplying an identity code from the subscriber adapter unit (70), via the allocated communication channel (CH1), to the network adapter unit (60); and
   establishing a connection between the network adapter unit (60) and the public telecommunication network (20).

25. Method according to claim 1, further comprising the steps of:
   receiving, on the first signal port (65), a status signal from the public telecommunication network (20) after the channel establishing step (S120);
   delivering the status signal to the first communication arrangement (100) via the communication system (110);
   receiving, on the fourth signal port (90), a dial sequence from the communication arrangement (100); and
   delivering the dial sequence to the public telecommunication network (20).

26. Method according to claim 25, further comprising the steps of:
   interpreting, in an exchange of the public telecommunication network (22), a part of the inputted signal sequence as a receiver code;
   determining, as a consequence of the identity of the calling communication arrangement (100), a memory position in a memory means (438) in the public telecommunication network;
   storing the receiver code in the determined memory position.

27. Method according to claim 1, further comprising the steps of:
   receiving, on the first signal port (65), a dial tone from the public telecommunication network (20);
   delivering the dial tone to the first communication arrangement (100) via the communication system (110);
   determining, as a consequence of the identity of the calling communication arrangement (100), a memory position in a memory means (438) in the public telecommunication network;
   reading a receiver code from the determined memory position; and
   establishing a connection between the first communication arrangement (100) and a second communication arrangement (30,40) determined by the receiver code.

28. Method according to claim 1, wherein the method further comprises the steps of:
   receiving a signal at the fourth signal port or at the first signal port;
   producing a message ($M_t$) as a consequence of the received signal;
   converting the message ($M_t$) to a digital message signal ($S_{gt}$);
   producing a digital sequence signal ($S_d$);
   producing a coded message signal as a consequence of the digital message signal ($S_{mt}$) and the digital sequence signal ($S_d$); and
   sending the coded message signal via the communication channel (CH1, CH2).

29. Method according to claim 1, wherein the communication channel is a radio channel.

30. Method according to claim 29, further comprising the step of directing the transmitter signal in a precise direction when transmitting a message on the radio channel.

* * * * *